UNITED STATES PATENT OFFICE.

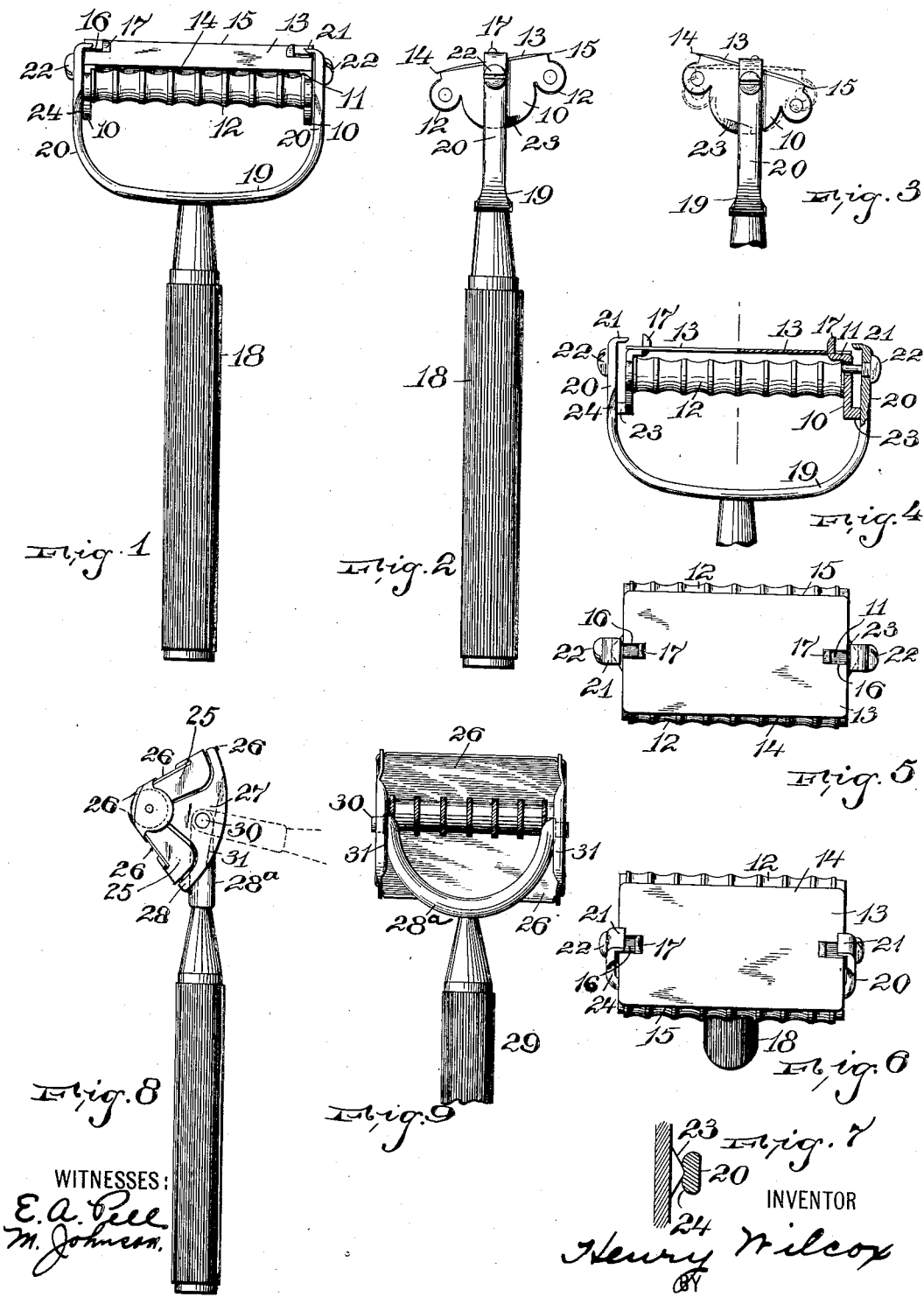

HENRY WILCOX, OF NEWARK, NEW JERSEY, ASSIGNOR OF ONE-HALF TO WELLESLEY W. GAGE, OF NEW YORK, N. Y., AND ONE-HALF TO FRANK BRABSON, OF NEWARK, NEW JERSEY.

SAFETY-RAZOR.

939,935.  Specification of Letters Patent.  Patented Nov. 9, 1909.

Application filed September 19, 1908. Serial No. 453,772.

*To all whom it may concern:*

Be it known that I, HENRY WILCOX, a citizen of the United States, residing at Newark, in the county of Essex and State of New Jersey, have invented certain new and useful Improvements in Safety-Razors; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

This invention relates to a safety razor in which the blade or blades are held securely on the casing and locked and at the same time brought into operative position by swinging a pivoted handle in either direction from a perpendicular position in its relation to the casing. The handle when perpendicular to the casing releases the blade or blades so that they can be withdrawn.

The invention is particularly designed to provide a casing having a blade with its opposite edges sharpened and resting on the casing, the handle being arranged to swing on the casing and having a spring yoke to engage the edges of the blade to lock the blade when the handle is swung in either direction from the perpendicular, whereby the two edges of the blade are alternately placed into operative position.

The invention is illustrated in the accompanying drawing, in which—

Figure 1 is a front view of the razor with the blade locked in one position. Fig. 2 is a side view of the same, and Fig. 3 is a side view with the casing and blade shifted to bring the other edge of the razor into operative position. Fig. 4 is a view similar to Fig. 1 with the casing and handle in position to release the blades. Fig. 5 is a top view of Fig. 4, and Fig. 6 is a top view of Fig. 1. Fig. 7 is a detail view of the means on the casing for spreading the handle. Figs. 8 and 9 are a side view and back view, respectively, of a modified form of construction.

The casing consists of the side plates 10 having inturned flanges 11 and having the guards 12 which may be as illustrated in the shape of fluted rolls or can be of the usual toothed form. On the casing is placed a blade 13 having its two opposite edges sharpened as at 14 and 15 and having slots 16 extending in from its opposite ends and acting to center the blade when placed on the casing by receiving the studs 17. A handle 18 has a yoke 19 thereon, which yoke is made of spring material and has a tendency to have its arms 20 grasp the sides of the casing. The arms 20 are turned over into fingers 21 which are adapted to fit down against the blade when the casing and its blade are swung on the pivots 22 which have a sliding bearing in the sides 10 of the casing.

When the handle and casing are placed approximately perpendicular to each other, the knobs or cams 23 ride up on the rounded edges 24 of the yokes 20 and spread the yoke so that it assumes the position shown in Figs. 4 and 5, and the blade 13 can be inserted in or withdrawn from the casing. The spring arms 20 are grooved on their inner faces so as to be engaged and held in position by the cams 23 to hold the arms 20 apart to release the blade as shown in Fig. 7. When the handle and the casing are swung to either side, the yoke has a tendency to spring inward and the cams 23 and the arms 20 act to snap the casing in either of the positions shown in Fig. 2 or Fig. 3. This causes the fingers 20 to close downwardly and inwardly on the blade and securely locks the blade in position, since an inclined face on the cams 23, on each side, forces the casing to clasp the blade tighter. Thus the yoke on the handle and the knob on the casing coöperate to lock the blade in position and also have the casing assume an angle that makes one edge of the blade operative for shaving, in its relation to the handle, since the cutting edge of a blade should assume a slightly acute angle to the handle. The edge of the blade at an obtuse angle to the casing is not in a position to be used for shaving. Thus in Fig. 2 the edge 14 is in position to be used and the edge 15 is not available, while a simple swinging of the handle and casing to the position shown in Fig. 3 makes the edge 15 operative and the edge 14 useless. A centering of the parts as in dotted outline in Fig. 3 makes the blade removable.

A modified form is illustrated in Figs. 8 and 9 in which case I provide a casing 25 with channels for holding a pair of blades 26 at an angle to each other. Projecting back from the casing are the spring sides 27 with fingers 28 which fit against the back of the corners of the blades 26 as illustrated in the drawings. The yoke 28ª of the handle 29 is pivoted at 30 in the spring sides 27 and is forced into its place by the spring in the sides exerting a pressure through the edges or cams 31. When the handle is swung as shown dotted in Fig. 8, the spring sides 27 are spread and the fingers 28 forced beyond the sides of the blades and the blades can be removed or inserted.

The above described razor is cheaply made and easily cleaned, since the removal of the blade leaves all the top of the casing open, as no fastening means bridge the casing nor is any screwing or turning of parts necessary. The blade is made stiff enough to form a good shaving surface, and it can be suitably stiffened by ribs or clips, as would occur to any mechanic skilled in the art.

Having thus described my invention, what I claim is:—

1. A safety razor comprising a casing, a blade on the casing, the blade having its opposite edges sharpened, a handle pivoted to the casing and in pivotal relation therewith whereby the handle can be swung to a tilted position on either side to place either of the sharpened edges in operative position, and coöperating elements on the handle and the casing to lock the blade on the casing and lock the casing in its tilted position on the handle, said elements being operated by the swinging of the handle.

2. A safety razor comprising a casing, a blade on the casing, a handle having a yoke to embrace the sides of the casing, the yoke having arms made of spring material and having a spring action toward each other, a cam on each side of the casing and adapted to be acted on by the arms to force the casing at an angle to the arms, and fingers on the ends of the arms to engage the blade to lock it on the casing.

3. A safety razor comprising a casing, a blade on the casing, a handle having a yoke made of spring material, the yoke having arms pivoted to the casing and having inwardly projecting fingers to engage the blade when the casing is tilted, and cams on the opposite sides of the casing to engage the spring arms and lock the casing in its tilted position.

4. A safety razor consisting of side plates, studs on the side plates, cams on the side plates, a blade adapted to rest on the side plates and having slots to receive the studs, a handle, a yoke on the handle having arms pivoted in the side plates, the arms having a spring action and being adapted to be engaged by the cams on the side plates, and fingers on the ends of the arms.

5. A safety razor having a casing consisting of side plates, and fluted rollers connecting the opposite ends and adapted to form guards, a blade with its two opposite edges sharpened and secured on the casing with its sharpened edges adjacent to the guards, a handle pivoted to the casing, and co-acting elements on the handle and the casing whereby the swinging of the handle locks the blade on the casing and locks the casing in its different positions.

6. A safety razor comprising a handle having a yoke thereon, the arms of the yoke having a spring action, a casing pivoted in the yoke, a blade on the casing, and co-acting elements on the yoke and the casing to cause the yoke to spread or allow it to contract as the casing is tilted, to respectively release or lock the blade.

7. A safety razor comprising a handle having a yoke consisting of spring arms, a casing pivoted between the spring arms, a blade on the casing, and co-acting elements between the spring arms and the casing to cause the spring arms to spread or allow them to contract, the contraction of the arms locking the blade on the casing.

8. A safety razor comprising a casing forming a guard, a handle having a yoke to embrace the casing and being in pivotal relation therewith, a blade on the casing having its opposite edges sharpened, and means for engaging the ends of the blade when the casing is tilted to lock the blade on the casing.

9. A safety razor comprising a casing forming a guard, a handle having a yoke in which the casing is pivotally held and can be tilted, a blade having its opposite edges sharpened, and fingers on the end of the yoke to engage the ends of the blade when the casing is tilted.

10. A safety razor comprising a casing forming a guard, a handle having a yoke in which the casing is pivotally held and can be tilted, a blade having its opposite edges sharpened, fingers on the end of the yoke to engage the ends of the blade when the casing is tilted, and co-acting means on the yoke and casing to automatically lock the casing when it is tilted.

11. A razor comprising a casing forming a guard, a blade on the casing, and a handle pivotally arranged on the casing to permit the casing being tilted and adapted to engage the top of the blade at its ends to lock it in position on the casing when the casing is tilted.

12. A razor comprising a casing forming a guard, a blade on the casing with its two opposite edges sharpened, a handle pivotally supporting the casing, and means on the handle for engaging the top of the blade at its ends when the casing is at its limits of movement when tilted and adapted to be disengaged from the blade when the casing is substantially central of the handle, and means for causing the disengagement of the top of the handle and the blade.

13. A razor comprising a casing forming a guard, a blade on the guard, a cam on each side of the casing, a handle having spring arms with a central groove on their inner faces, the arms being pivoted to the casing, and fingers on the arms to engage the blade when the casing is tilted, the cams locking the arms in tilted position, the cams resting in the grooves of the arms when the casing is tilted and acting to release the blade.

14. A safety razor comprising a casing forming a guard having studs at its ends, a blade having slots on its ends to receive the studs, a handle pivoted to the casing and permitting the casing to tilt, the handle having spring arms to engage the top of the blade at its ends when the casing is tilted, and co-acting means on the casing and on the handle to release the blade when the casing is central.

15. A safety razor comprising a casing forming a guard, studs at the opposite ends of the casing, a blade having slots to receive the studs and to be positioned thereby, a handle pivoted to the casing and permitting the casing to tilt, the handle having spring arms to embrace the ends of the casing, fingers on the ends of the arms to engage the top of the blade at its ends when the casing is tilted, and cams on the ends of the casing to engage the spring arms to spread them when the casing is central.

16. A razor comprising a casing forming a guard, studs at the opposite ends of the casing, a blade having its opposite edges sharpened and having slots at its opposite ends, the slots being adapted to receive the studs, a handle having spring arms to embrace the casing and pivoted thereto, fingers on the ends of the arms to engage the top of the blade at its ends when the casing is tilted, and cams on the ends of the casing to engage the arms to spread them when the casing is central, the spring arms having grooves on their inner faces to receive the cams to lock the casing when it is central.

In testimony, that I claim the foregoing, I have hereunto set my hand this 18th day of September, 1908.

HENRY WILCOX.

Witneses:
  E. A. Pell,
  Wm. H. Camfield.